1,965,552

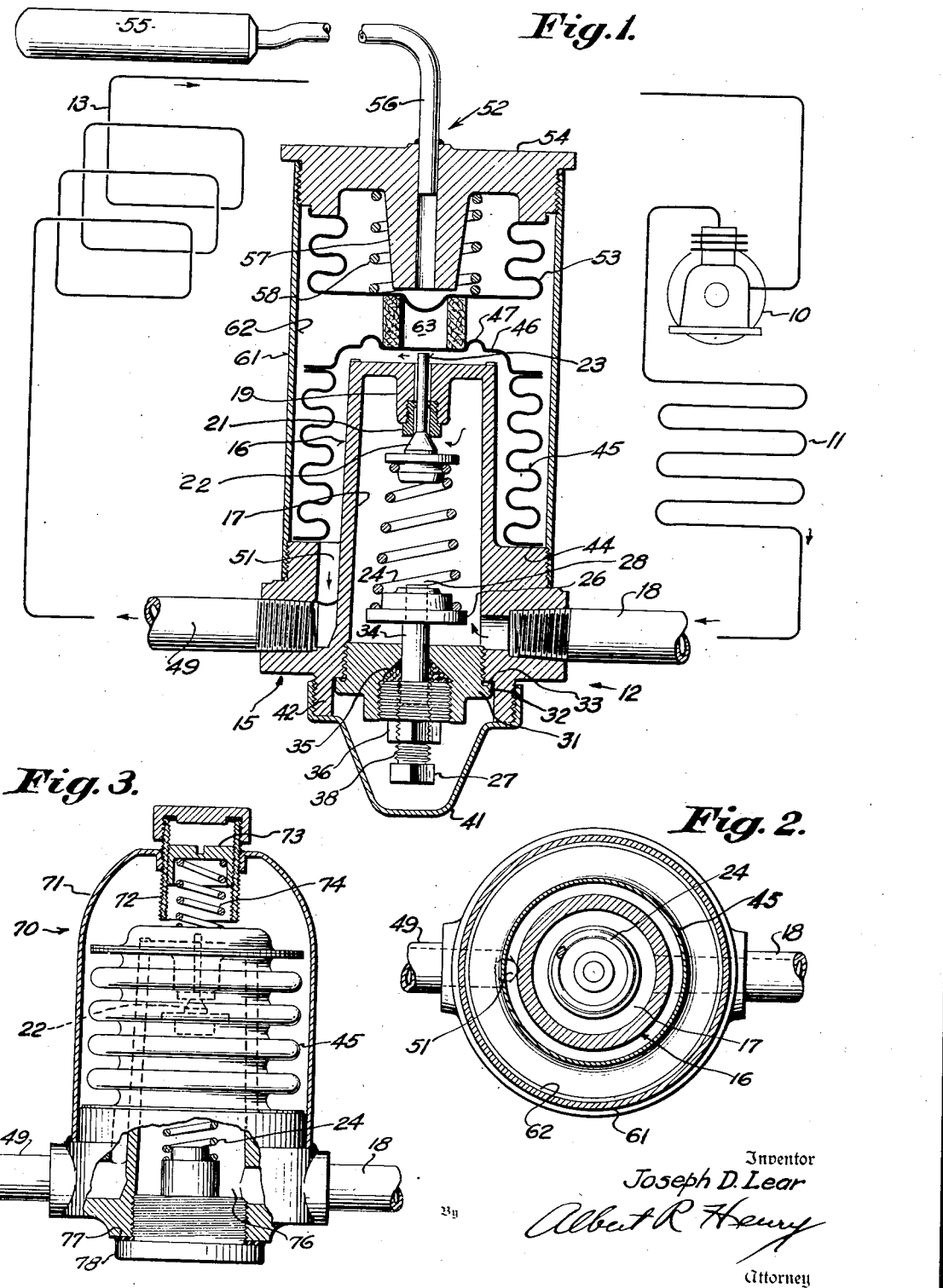
July 3, 1934.  J. D. LEAR  1,965,552
REFRIGERANT CONTROL DEVICE
Filed Nov. 19, 1932
Inventor
Joseph D. Lear
Albert R. Henry
Attorney Patented July 3, 1934

UNITED STATES PATENT OFFICE 1,965,552

REFRIGERANT CONTROL DEVICE

Joseph D. Lear, Buffalo, N. Y., assignor to Fedders Manufacturing Company, Inc., Buffalo, N. Y.

Application November 19, 1932, Serial No. 643,416

6 Claims. (Cl. 236—92)

This invention relates to refrigerant control devices for direct expansion types of refrigeration systems.

The invention is more particularly directed to a control valve structure in which a valve housing is closely encompassed by a bellows for the dual purpose of obtaining a compact unit and providing heat exchange between the housing and bellows. This structure is specially adapted for use in conjunction with an expansible portion of a thermostatic device which may be mounted in relatively intimate relation with the bellows without substantial heat transference from the expansible portion to the bellows.

Other features of the invention are more fully set forth in the accompanying specification and drawing, wherein:

Fig. 1 is a vertical section through a thermostatically operated control valve;

Fig. 2 is a cross section on the line 2—2 of Fig. 1;

Fig. 3 is a vertical section through a pressure responsive control valve utilizing certain of the principles shown in Fig. 1.

The thermostatic valve shown in Figs. 1 and 2 may be associated with a direct expansion refrigeration system as shown diagrammatically in Fig. 1, wherein a compressor 10 forces liquid refrigerant through a condenser 11 and thence into the valve 12. The output of the valve 12 is in communication was a cooling member or evaporator 13 which discharges the gaseous heated refrigerant to the compressor. This comprises the well-known "dry" type system of evaporation, and it will be understood that where conditions indicate, the valve hereinafter described may be associated with other systems of evaporation.

The valve 12 consists of a generally cylindrical housing formed with a base 15 having a cylindrical projection 16, which is centrally cored to form a valve chamber 17, adapted to communicate with the "high" or condenser side of the system through an input conduit 18. At the upper end of the chamber 17 the wall thereof is formed with a drilled boss 19 fitted with a valve seat member 21. A downward opening valve 22, adapted to engage the seat member 21, is formed with an axial stem portion 23 which is received for guided movement within the seat member 21 and which projects through the boss 19 to the exterior of the portion 16.

Means are provided for retaining the valve in seated position, comprising a spring having its upper end resiliently engaging a reduced mounting shoulder 25 formed on the valve 22 and having its lower end mounted on a flanged member 26. The spring is adjustable by means of an adjusting screw 27 which is rotatably mounted relative to the member 26 by means of a shouldered extension 28 thereof entering a cooperating aperture in the member 26.

Since the refrigerant entering the chamber 17 is under considerable pressure, it is advisable to seal the adjusting screw 27 so that it may be manipulated externally of the valve device without leakage from the chamber 17. The sealing means comprises a gland 31 screwed into the wall of the chamber 17 and provided with a peripheral knife edge portion 32 adapted to engage in fluid tight relation a shoulder 33 formed in the base 15. The gland 31 is centrally drilled to rotatably receive the stem portion 34 of the adjusting screw and it is counter-bored to receive a packing 35 which engages about such portion of the adjusting screw. A packing nut 36 is threaded into the counterbore of the gland 31 and it is adapted to compress the packing 35 into intimate contact with the stem 34. In addition to this, the packing nut 36 is centrally threaded to receive a threaded portion 38 of the adjusting screw 27 whereby axial adjustment thereof is possible. A cover 41 is engaged on a threaded hub 42 of the base 15 and it acts as a concealing member and an additional seal for the previously described mechanism.

The construction above described is particularly adapted for the removal of both the valve 22 and seat member 21. This may be accomplished by removing the gland 31 which, it will be noted, carries all of the adjusting mechanism. Upon this removal, the valve and attached spring 24 drops from the chamber 17 and the seat 21 is then accessible for removal by a suitable tool.

The base 15 is formed with a shoulder 44 which provides a mounting means for the lower end of a sealing bellows 45, which is soldered or otherwise secured to provide a leak-proof joint. The bellows extends upward from the shoulder 44 and encloses the cylindrical projection 16. The upper face 46 of the bellows is formed with a circular projection 47 hereinafter more fully described. It will be noted that the inner peripheries of the convolutions of the bellows 45 are slightly spaced from the outer wall of the portion 16 and that the upper face of the bellows is engageable with the protruding stem 23 of the valve 22. The interior of the bellows 45 is thus in communication with any fluid discharged through the valve 22 from the chamber 17 and this fluid is in turn dischargeable through an output conduit 49 leading to the evaporator 13 through a drilled hole 51 formed in the shoulder portion 44 of the base 15.

A thermostatic unit generally indicated by the numeral 52 is adapted to actuate the valve 22 by moving the bellows 45 to depress the valve. It comprises a bellows 53 sealed to a head 54 by soldering or the like, and in communication with a bulb 55 through a conduit 56 which enters the head 54. The head is formed with a depending stop portion 57 which is adapted to be engaged by the bellows 53 at an extreme position of movement thereof to prevent rupture, as hereinafter more fully described. A spring 58 is mounted between the head and the bellows 53 to urge the bellows downward. The head 54 is exteriorly threaded for connection with a tubular casing 61, which is secured at its opposite extremity to the base 15. The casing 61 forms an interior chamber 62 which contains air or other suitable gas and it is preferably sealed from the outer atmosphere by soldering the joints between the casing 61 and the head 54 and base 15, so that moisture may not be admitted thereto.

The bellows 53 and 45 are connected for unitary operation, and, inasmuch as it is preferred that heat transferrence between these members be retained at a minimum, the connecting means comprises a washer 63 of a material of low heat conductivity. This washer is adapted to be received at its lower extremity within the circular projection 47 of the bellows 45, and at its upper extremity it receives a central bead formed in the bellows 53.

In operation the bulb 55, which together with the bellows 53 contains an expansible medium such as methyl chloride, is secured or associated with the evaporator 13 so that heat transferrence is obtained for causing the fluid in the bulb 55 to expand or contract. The bulb and bellows 53 are properly charged so that when the evaporator becomes relatively warm the fluid will expand and cause the bellows 53 to urge the upper face 46 of the sealing bellows 45 downward and accordingly to open the valve 22. This permits fluid to enter the bellows 45 and to be conveyed into the evaporator through the drilled hole 51 and conduit 49, whereupon the fresh supply of refrigerant entering the evaporator lowers the temperature thereof and the bulb 55 is accordingly cooled with an accompanying contraction of the fluid in the power bellows and closing of the valve 22. It will thus be seen that the power bellows is at all times responsive to the temperature conditions in the evaporator 13 and is operative to feed refrigerant thereto in response to such temperatures.

The above described operation, as far as the underlying principle is concerned, is well known in the art and is not broadly claimed as novel in this application, but it will be observed that the proximity of the body of liquid refrigerant within the chamber 17 to the bellows 45 will affect the temperatures within the bellows so that such temperatures will be maintained relatively high compared to those in previous devices. This will in turn affect the operating temperatures of the air within the chamber 62 and of the casing 61 and will thus prevent the transmittal of subnormal temperatures to the power bellows 53.

In actual practice it has been found that the temperature of the high side liquid varies between 50 and 70 degrees Fahrenheit, and that the temperature of the gasified refrigerant on the low side of the system, that is within the bellows 45 and evaporator 13, varies between zero and a slightly higher temperature. The rapid expansion of the gases in the chamber of the bellows 45, however, causes them to travel at a high velocity, but in view of the fact that the chamber is restricted by the projection 16, the expanded gases will be sufficiently heated by contact with the wall of the projection 16 to discourage the absorption of heat through the walls of the bellows 45.

It will be observed that the structure above described not only permits the utilization of the space within the sealing bellows 45 for a valve and spring unit and associated heating unit (the chamber 17) but permits the power and sealing bellows to be brought into close proximity (relative to all former structures) and thereby permits the entire valve device to be brought into compact form. The principle above disclosed, together with the various structural details permitting this close combination of parts, is merely exemplary of one practical embodiment of the invention, and it will be obvious to those skilled in the art that this principle may be applied in other manners.

For example, according to Fig. 3 certain of the structural features of the described thermostatic valve 12 may be incorporated in pressure responsive control valve 70. In this device the thermostatic unit 52 is not used and the casing 71 is accordingly formed at its upper portion to receive a threaded sleeve 72 which receives an adjusting nut 73. A spring 74 contacts the top of the bellows 45 and it is adjustable to oppose the action of the valve spring 24, which in this case is of a fixed setting. The remainder of the structure may be identical to the lower portions of the described thermostatic valve, with the exception that the bottom of chambered portion 76 of the housing terminates in a circular pad 77 for receiving a sealing gasket for a threaded spring retaining member 78.

I claim:

1. In a refrigerant control device for direct expansion type refrigeration systems, a member formed with a chambered projection in communication with compressed refrigerant, a bellows enclosing said projection and having its interior in communication with the cooling member of the refrigeration system, a thermostatic control unit responsive to temperatures in said cooling unit and having an expansible portion, means connecting said bellows and said expansible portion whereby said bellows is depressible thereby, and valve means connected for operation by said bellows for controlling fluid communication between the chamber of the projection and the interior of the bellows.

2. In a refrigerant control device for direct expansion type refrigeration systems, a member having a chambered projection in communication with compressed refrigerant, a seat in the chamber of the projection in communication with the exterior thereof, a valve on the seat, means extending from said valve through the seat to the exterior of said projection, a bellows enclosing said chambered projection and having its interior in communication with the cooling member of the refrigeration system, a thermostatic control unit having an expansible portion for operating said valve, means connecting said bellows and said expansible portion whereby said bellows is depressible thereby to engage said valve portion and unseat said valve, and casing means secured to said housing for mounting said expansible portion in operative position relative said bellows.

3. In a refrigerant control device for direct expansion refrigeration systems, a member formed with a chambered projection in communication with compressed refrigerant, a sealing bellows enclosing said chambered projection and having its interior in communication with the cooling member of the refrigeration system, a thermostatic control unit responsive to temperatures in the cooling unit and having an expansible bellows, means connecting said sealing bellows to said second bellows whereby said sealing bellows is depressible thereby, valve means connected for operation by said sealing bellows for controlling communication between the chamber of the projection and the interior of the sealing bellows, and casing means mounted on said member and enclosing both of said bellows, said casing being hermetically sealed.

4. In a refrigerant control device for direct expansion type refrigeration systems, a member having a cylindrical projection formed with a coaxial open chamber, a conduit transversely entering said chamber and in communication with the compressor of the refrigeration system, a seat member in the end wall of the chamber, a valve on the seat having a portion extending through the seat to the exterior of said member, a bellows enclosing said projection and having its interior in communication with the cooling member of the refrigeration system, spring means engaging said valve to retain it on its seat, adjusting means for tensioning said spring means, and mounting means for said adjusting means comprising a gland member closing the open end of said chamber.

5. In a refrigerant control device for direct expansion refrigeration systems, a member formed with a chambered projection in communication with compressed refrigerant, a bellows enclosing said projection and having its interior in communication with the cooling member of the refrigeration system, valve means connected for operation by said bellows for controlling communication between the chamber of the projection and the interior of the bellows, and a casing mounted on said member and enclosing said bellows, said casing being hermetically sealed.

6. In a refrigerant control device for direct expansion refrigeration systems, a member formed with a chambered projection in communication with compressed refrigerant, a bellows enclosing said projection and having its interior in communication with the cooling member of the refrigeration system, valve means connected for operation by said bellows for controlling communication between the chamber of the projection and the interior of the bellows, and a casing mounted on said member and enclosing said bellows, said casing being hermetically sealed, and resilient adjustment means within said casing engaging said bellows.

JOSEPH D. LEAR.